US010800390B2

(12) United States Patent
Ninoyu et al.

(10) Patent No.: US 10,800,390 B2
(45) Date of Patent: Oct. 13, 2020

(54) HYDRAULIC PRESSURE GENERATING DEVICE AND SPOOL POSITION PRESUMING DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP); Yoshio Masuda, Anjo (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 151 days.

(21) Appl. No.: 15/746,675

(22) PCT Filed: Jul. 25, 2016

(86) PCT No.: PCT/JP2016/071733
§ 371 (c)(1),
(2) Date: Jan. 22, 2018

(87) PCT Pub. No.: WO2017/018380
PCT Pub. Date: Feb. 2, 2017

(65) Prior Publication Data
US 2018/0208169 A1 Jul. 26, 2018

(30) Foreign Application Priority Data
Jul. 29, 2015 (JP) ................................ 2015-150131

(51) Int. Cl.
B60T 13/68 (2006.01)
B60T 15/36 (2006.01)
(Continued)

(52) U.S. Cl.
CPC ............ B60T 13/686 (2013.01); B60T 7/042 (2013.01); B60T 8/00 (2013.01); B60T 8/4077 (2013.01);
(Continued)

(58) Field of Classification Search
CPC .... B60T 13/686; B60T 13/662; B60T 13/146; B60T 13/14; B60T 13/68; B60T 8/4077; B60T 8/00; B60T 7/042; B60T 15/36
See application file for complete search history.

(56) References Cited

U.S. PATENT DOCUMENTS 5,129,229 A * 7/1992 Nakamura ............ E02F 9/2232
60/452
5,152,140 A * 10/1992 Hirata ................... E02F 9/2232
60/450
(Continued)

FOREIGN PATENT DOCUMENTS

CN 1690449 A 11/2005
JP 06-278594 A 10/1994
(Continued)

OTHER PUBLICATIONS

International Search Report (PCT/ISA/210) dated Aug. 30, 2016, by the Japan Patent Office as the International Searching Authority for International Application No. PCT/JP2016/071733.
(Continued)

*Primary Examiner* — Dustin T Nguyen
(74) *Attorney, Agent, or Firm* — Buchanan Ingersoll & Rooney PC (57) ABSTRACT

The hydraulic pressure generating device includes a regulator (spool valve) formed by a cylinder body, a spool which slidably moves within the cylinder body, a pilot chamber in which a pilot pressure which is a hydraulic pressure moving the spool along in an axial direction is inputted and an output
(Continued)

chamber out of which an output pressure which is a hydraulic pressure corresponding to the pilot pressure is outputted, wherein the hydraulic pressure generating device further includes a spool position obtaining portion which obtains a relative position of the spool relative to the cylinder body and a pilot pressure controlling portion which controls the pilot pressure based on the relative position obtained by the spool position obtaining portion.

4 Claims, 6 Drawing Sheets

(51) Int. Cl.
 *B60T 13/66* (2006.01)
 *B60T 13/14* (2006.01)
 *B60T 7/04* (2006.01)
 *B60T 8/40* (2006.01)
 *B60T 8/00* (2006.01)

(52) U.S. Cl.
 CPC ............ *B60T 13/14* (2013.01); *B60T 13/145* (2013.01); *B60T 13/146* (2013.01); *B60T 13/662* (2013.01); *B60T 13/68* (2013.01); *B60T 15/36* (2013.01)

(56) References Cited

U.S. PATENT DOCUMENTS

| | | | | |
|---|---|---|---|---|
| 6,725,731 | B2* | 4/2004 | Wiklund | F15B 15/2838 |
| | | | | 73/861.52 |
| 8,522,923 | B2* | 9/2013 | Shimizu | F15B 11/05 |
| | | | | 184/6.12 |
| 8,757,196 | B2* | 6/2014 | Eriksson | F15B 11/05 |
| | | | | 137/484.2 |
| 2005/0016168 | A1 | 1/2005 | Singh | |
| 2013/0318963 | A1 | 12/2013 | Masuda et al. | |
| 2014/0079560 | A1* | 3/2014 | Hodges | F04B 47/04 |
| | | | | 417/15 |

FOREIGN PATENT DOCUMENTS

| | | |
|---|---|---|
| JP | 11-105687 A | 4/1999 |
| JP | 2012-171431 A | 9/2012 |

OTHER PUBLICATIONS

Written Opinion (PCT/ISA/237) dated Aug. 30, 2016, by the Japan Patent Office as the International Searching Authority for International Application No. PCT/JP2016/071733.

Office Action (Notification of the First Office Action) dated Jul. 23, 2019, by the China National Intellectual Prope Administration in corresponding Chinese Patent Application No. 201680043319.X and an English Translation of the Office Action. (14 pages).

* cited by examiner

FIG 5

HYDRAULIC PRESSURE GENERATING DEVICE AND SPOOL POSITION PRESUMING DEVICE

TECHNICAL FIELD

This invention relates to a hydraulic pressure generating device and a spool position presuming device.

BACKGROUND ART

One form of a hydraulic pressure generating device has been known which is disclosed in Patent Literature 1. The hydraulic pressure generating device disclosed in FIG. 1 of the Patent Literature 1 includes a hydraulic pressure control valve 13 which controls the opening and closing of a spool valve (valve body) 14 by a supplied instruction current "I", a brake hydraulic pressure generating source 5 which generates a brake hydraulic pressure and a controller 4 which outputs the instruction current "I" corresponding to a target hydraulic pressure obtained from a master cylinder hydraulic pressure signal Sb. The controller 4 outputs the maximum value instruction current "I" for the maximum value output time corresponding to the deviation amount between the target hydraulic pressure and the brake hydraulic pressure which is applied to the wheel cylinder 27. According to this structure, the responsiveness of the hydraulic pressure control valve 13 and eventually the responsiveness to the brake operation can be improved.

CITATION LIST

Patent Literature

[Patent Literature 1] JP 11(1999)-105687A

SUMMARY OF INVENTION

Technical Problem(s)

A further improvement in responsiveness of the spool valve has been demanded in addition to the improvements in the hydraulic pressure generating device disclosed in the Patent Literature 1.

Accordingly, this invention was made in consideration with the above-mentioned situation and the objective of the invention is to provide a hydraulic pressure generating device and a spool position presuming device which improve the responsiveness of the spool valve.

Solution to Problem(s)

The hydraulic pressure generating device associated with an aspect of the invention includes a spool valve formed by a body, a spool which slidably moves within the body, a pilot chamber in which a pilot pressure which is a hydraulic pressure moving the spool along in an axial direction is inputted and an output chamber out of which an output pressure which is a pressure corresponding to the pilot pressure is outputted. The hydraulic pressure generating device further includes a spool position obtaining portion which obtains a relative position of the spool relative to the body and a pilot pressure controlling portion which controls the pilot pressure based on the relative position obtained by the spool position obtaining portion.

Further, the spool position presuming device associated with another aspect of the invention includes the spool valve formed by a body, a spool which slidably moves within the body, a pilot chamber in which a pilot pressure which is a hydraulic pressure moving the spool along in an axial direction is inputted and an output chamber out of which a output pressure which is a pressure corresponding to the pilot pressure is outputted, the pilot chamber being defined by one end surface of the spool in an axial direction. The spool position presuming device further includes a liquid amount obtaining portion which obtains a liquid amount flowing into and out of the pilot chamber, a liquid amount calculating portion which calculates the liquid amount in the pilot chamber based on the liquid amount obtained by the liquid amount obtaining portion and a spool position deriving portion which derives the relative position of the spool relative to the body based on a divided value of the liquid amount which is calculated by the liquid amount calculating portion divided by an area of the one end surface of the spool.

Effect of Invention

According to one aspect of the invention, the relative position of the spool can be obtained more accurately and yet in an early stage. Further, based on the relative position obtained accurately and in an early stage, the pilot pressure can be controlled to drive the spool. Accordingly, the responsiveness of the spool valve can be able to be improved and a hydraulic pressure generating device which has improved the responsiveness of the spool valve can be proposed.

According to another aspect of the invention, the relative position of the spool can be derived (presumed) based on the liquid amount in the pilot chamber, even when the spool is positioned in an overlapping area. Further, based on the relative position thus derived, the pilot pressure can be controlled to drive the spool. Accordingly, the responsiveness of the spool valve can be able to be improved and a spool position presuming device which has improved the responsiveness of the spool valve can be proposed.

EMBODIMENTS FOR IMPLEMENTING INVENTION

Figure 1:
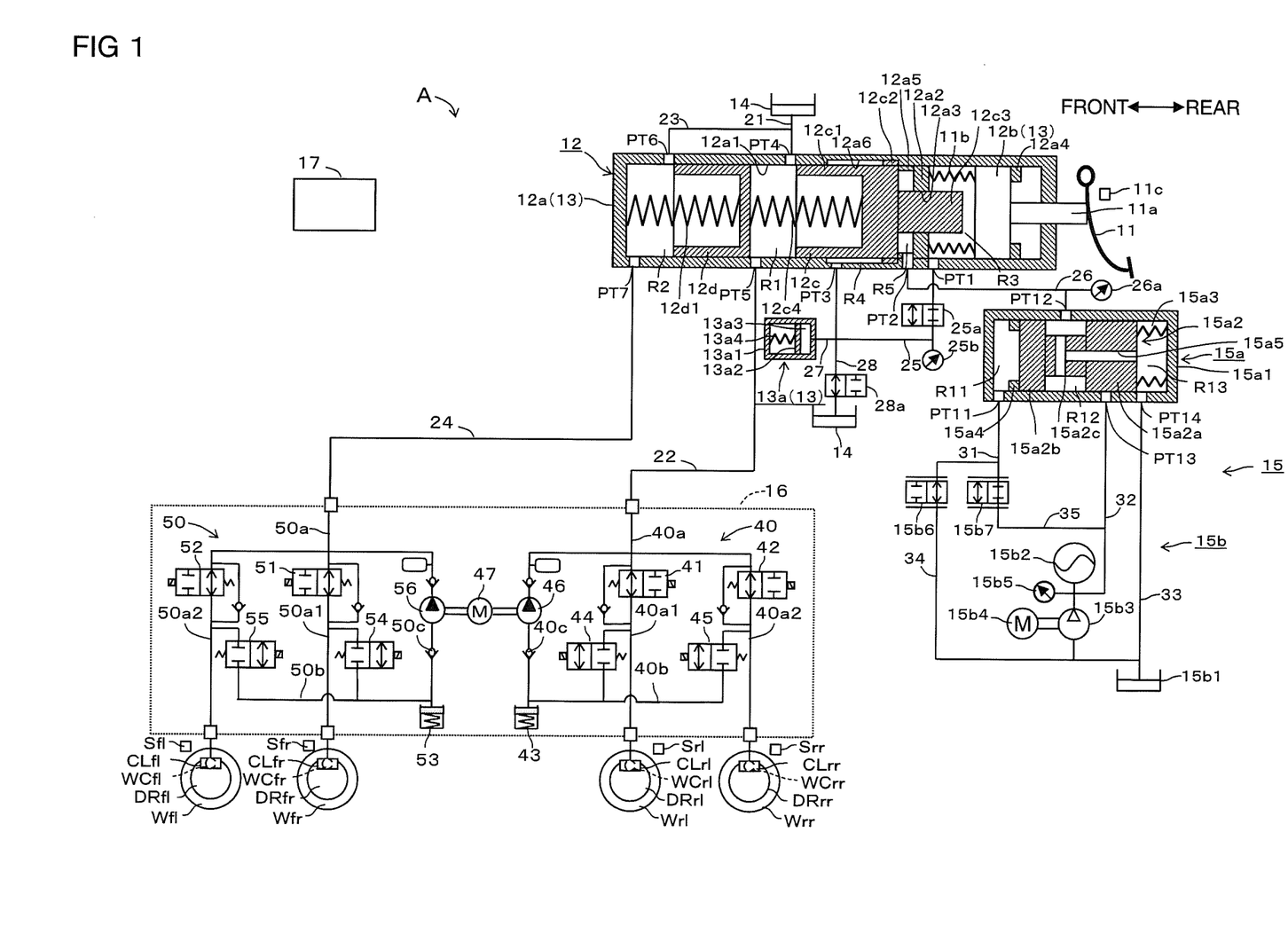
FIG. 1 is a structural view of the hydraulic pressure generating device according to an embodiment of the invention.

The hydraulic pressure generating device and the spool position presuming device according to the invention will be explained with reference to the attached drawings as an embodiment adapted to a vehicle. The vehicle is equipped with a hydraulic pressure braking force generating device A which applies brake to the vehicle by directly applying the hydraulic pressure braking force to each wheel Wfl, Wfr, Wrl and Wrr. As shown in FIG. 1, the hydraulic pressure braking force generating device A includes a brake pedal 11 which is a brake operating member, a master cylinder 12, a stroke simulator portion 13, a reservoir 14, a booster mechanism (hydraulic pressure generating device) 15, an actuator (brake hydraulic pressure adjusting device) 16, a brake ECU 17 and a wheel cylinder WC.

The wheel cylinder WC restricts the rotation of the vehicle wheel W and is provided at the caliper CL. The wheel cylinder WC functions as a braking force applying mechanism which applies braking force to the vehicle wheel W based on the pressure of brake fluid (brake hydraulic pressure) from the actuator 16. When the brake hydraulic pressure is applied to the wheel cylinder WC, each piston (not shown) of the wheel cylinder WC pushes a pair of brake pads (not shown) which is the friction member to sandwich and squeeze a disc rotor DR which is a rotational member rotating unitary with the vehicle wheel W at both sides of the rotor DR to thereby restrict the rotation of the rotor. In this embodiment, a disc type brake system is adopted, but a drum type brake system can be adopted. The vehicle wheel W means any of the front left wheel Wfl, front right wheel Wfr, rear left wheel Wrl and rear right wheel Wrr.

The brake pedal 11 is connected to the stroke simulator portion 13 and the master cylinder 12 via the operating rod 11a. A pedal stroke sensor 11c is provided in the vicinity of the brake pedal 11 for detecting a brake pedal stroke (operating amount) which indicates a brake operating state generated by the depression of the brake pedal 11. The pedal stroke sensor 11c is connected to the brake ECU 17 to output the detection signal to the brake ECU 17.

The master cylinder 12 supplies the brake fluid with the actuator 16 in response to the operating amount of the brake pedal 11 (brake operating member) and is formed by a cylinder body 12a, an input piston 12b, a first master piston 12c and a second master piston 12d, etc.

The cylinder body 12a is provided with a cylinder bore 12a1. A partition wall portion 12a2 is provided on the inner peripheral surface of the cylinder bore 12a1 and is projecting inwardly in a flange shape. A through-hole 12a3 is formed at the central portion of the partition wall portion 12a2 and is penetrating therethrough in a front/rear direction. In the cylinder bore 12a1, the first and the second master pistons 12c and 12d are arranged in a frontward portion with respect to the partition wall portion 12a2 and are liquid-tightly and movably formed along in a front/rear direction.

An input piston 12b is arranged at a rearward portion of the cylinder bore 12a1 with respect to the partition wall portion 12a2 and is liquid-tightly and movably formed along in an axial direction. The input piston 12b slidably moves within the cylinder bore 12a1 in response to the operation of the brake pedal 11.

The input piston 12b is connected to the operating rod 11a which moves in association with the movement of the brake pedal 11. The input piston 12b is biased by a compression spring 11b in a direction where the volume of the first hydraulic pressure chamber R3 is expanded, i.e., in a rearward direction (right direction as viewed in the drawing). When the brake pedal 11 is depressed, the operating rod 11a moves forward against the biasing force of the compression spring 11b. Along with the advancement of the operating rod 11a, the input piston 12b also advances interlockingly. Also, when the depression of the brake pedal 11 is released, the input piston 12b retreats by the biasing force of the compression spring 11b until it contacts with a restriction projecting portion 12a4 and is positioned thereby.

The first master piston 12c is (integrally) formed in order from the front side by a pressurizing cylindrical portion 12c1, a flange portion 12c2 and a projecting portion 12c3 as a unit. The pressurizing cylindrical portion 12c1 is formed in a substantially bottomed cylindrical shape having an opening at the front side and is disposed in the cylinder bore 12a1 to liquid-tightly slide relative to the inner peripheral surface thereof. A coil spring 12c4 which is a biasing member is disposed in an inner space of the pressurizing cylindrical portion 12c1 between the second master piston 12d and the pressurizing cylindrical portion 12c1. The first master piston 12c is biased in a rearward direction by the coil spring 12c4. In other words, the first master piston 12c is biased in a rearward direction by the coil spring 12c4 and eventually is brought into contact with the restriction projecting portion 12a5 to be positioned thereby. This position of the first master piston 12c is defined as the initial position (predetermined in advance) at the time when the depression operation of the brake pedal 11 is released.

The flange portion 12c2 is formed such that the diameter thereof is formed larger than the diameter of the pressurizing cylindrical portion 12c1 and is disposed in an inner peripheral surface of a large diameter portion 12a6 of the cylinder bore 12a1 to liquid-tightly slide within the inner peripheral surface thereof. The projecting portion 12c3 is formed such that a diameter thereof is formed smaller than the diameter of the pressurizing cylindrical portion 12c1 and is arranged to be liquid-tightly slide through the through-hole 12a3 of the partition wall portion 12a2. The rear end portion of the projecting portion 12c3 projects inside of the inner space of the cylinder bore 12a1, passing through the through-hole 12a3 and is separated from the inner peripheral surface of the cylinder bore 12a1. The rear end surface of the projecting portion 12c3 is separated from the bottom surface of the input piston 12b and is formed such that the separated distance thereof is variable.

The second master piston 12d is arranged in the cylinder bore 12a1 at the front side of the first master piston 12c. The second master piston 12d is formed in a substantially bottomed cylindrical shape having an opening at the front side. A coil spring 12d1 which is a biasing member is disposed in an inner space of the second master piston 12d between the second master piston 12d and the inner bottom surface of the cylinder body 12a. The second master piston 12d is biased in a rearward direction by the coil spring 12d1. In other words, the second master piston 12d is biased towards the predetermined initial position by the coil spring 12d1.

The master cylinder 12 is formed by a first master chamber R1, a second master chamber R2, a first hydraulic pressure chamber R3, a second hydraulic pressure chamber R4 and a servo chamber (driving hydraulic pressure chamber) R5. The first master chamber R1 is defined by the cylinder body 12a (inner peripheral surface of the cylinder bore 12a1), the first master piston 12c (front side of the pressurizing cylindrical portion 12c1) and the second master piston 12d. The first master chamber R1 is connected to the reservoir 14 via a conduit 21 which is connected to the port PT4. Further, the first master chamber R1 is connected to a conduit 40a (actuator 16) via a conduit 22 which is connected to the port PT5.

The second master chamber R2 is defined by the cylinder body 12a (inner peripheral surface of the cylinder bore 12a1) and the front side of the second master piston 12d. The second master chamber R2 is connected to the reservoir 14 via a conduit 23 which is connected to the port PT6. Further, the second master chamber R2 is connected to a conduit 50a (actuator 16) via a conduit 24 which is connected to the port PT7.

The first hydraulic pressure chamber R3 is formed between the partition wall portion 12a2 and the input piston 12b and is defined by the cylinder body 12a (inner peripheral surface of the cylinder bore 12a1), the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the inner peripheral surface of the large diameter portion 12a6 of the cylinder bore 12a1, the pressurizing cylindrical portion 12c1 and the flange portion 12c2. The first hydraulic pressure chamber R3 is connected to the second hydraulic pressure chamber R4 via a conduit 25 which is connected to the port PT1 and the port PT3.

The servo chamber R5 is formed between the partition wall portion 12a2 and the pressurizing cylindrical portion 12c1 of the first master piston 12c and is defined by the cylinder body 12a (inner peripheral surface of the cylinder bore 12a1), the partition wall portion 12a2, the projecting portion 12c3 of the first master piston 12c and the pressurizing cylindrical portion 12c1. The servo chamber R5 is connected to the output chamber R12 via a conduit 26 which is connected to the port PT2.

The pressure sensor 26a is a sensor which detects the servo pressure (driving hydraulic pressure) supplied to the servo chamber R5 and is connected to the conduit 26. The pressure sensor 26a sends the detection signal to the brake ECU 17.

The stroke simulator portion 13 is formed by the cylinder body 12a, the input piston 12b, the first hydraulic pressure chamber R3 and the stroke simulator 13a which is connected to the first hydraulic pressure chamber R3. The first hydraulic pressure chamber R3 is connected to the stroke simulator 13a via the conduits 25 and 27 which are connected to the port PT1. It is noted that the first hydraulic pressure chamber R3 is connected to the reservoir 14 via a hydraulic passage (not shown).

The stroke simulator 13a generates a magnitude of stroke (reaction force) at the brake pedal 11 corresponding to the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves in the cylindrical portion 13a1 in response to the brake operation by the brake pedal 11. The reaction force hydraulic pressure chamber 13a3 is formed between the cylindrical portion 13a1 and the piston portion 13a2. The reaction force hydraulic pressure chamber 13a3 is connected to the first and the second hydraulic pressure chambers R3 and R4 via the conduits 27 and 25. The spring 13a4 biases the piston portion 13a2 in a direction where the volume of the reaction force hydraulic pressure chamber 13a3 decreases.

It is noted that the conduit 25 is provided with a first control valve 25a which is a normally closed type electromagnetic valve. A second control valve 28a which is a normally open type electromagnetic valve is provided in the conduit 28 which connects the conduit 25 and the reservoir 14. When the first control valve 25a is in a closed state, the communication between the first and the second hydraulic pressure chambers R3 and R4 is interrupted. Under such state, the input piston 12b and the first master piston 12c are moved with a predetermined distance maintained therebetween. Further, when the first control valve 25a is in an open state, the communication between the first and the second hydraulic pressure chambers R3 and R4 is established. Under this state, the volume change of the first and the second hydraulic pressure chambers R3 and R4 caused by the advance/retreat movement of the first master piston 12c can be absorbed by the transfer of the brake fluid.

The pressure sensor 25b is a sensor which detects the reaction force hydraulic pressure in the second hydraulic pressure chamber R4 and the first hydraulic pressure chamber R3 and is connected to the conduit 25. The pressure sensor 25b is also an operation force sensor which detects the operation force applied to the brake pedal 11. The pressure sensor 25b detects the pressure in the second hydraulic pressure chamber R4 when the first control valve 25a is in the closed state and detects also the pressure (or the reaction force hydraulic pressure) of the connected first hydraulic pressure chamber R3 when the first control valve 25a is in the open state. The pressure sensor 25b sends the detection signal to the brake ECU 17.

The booster mechanism 15 generates a servo pressure in response to the operating amount of the brake pedal 11. The booster mechanism 15 forms the hydraulic pressure generating device together with the brake ECU 17 and is equipped with the regulator 15a (corresponding to the spool valve in the claims) and the pressure supplying device 15b.

The regulator 15a is formed by the cylinder body 15a1 (corresponding to the body in the claims) and a spool 15a2 which slidably moves within the cylinder body 15a1. The regulator 15a is formed by a pilot chamber R11, the output chamber R12 and a hydraulic pressure chamber R13.

The pilot chamber R11 is defined by the cylinder body 15a1 and the front end surface (one end surface of the spool 15a2 in an axial direction) of the second large diameter portion 15a2b of the spool 15a2. The pilot chamber R11 is connected to the pressure decreasing valve 15b6 and the pressure increasing valve 15b7 (connected to the conduit 31) which are connected to the port PT11. The pilot pressure, which is a hydraulic pressure for moving the spool 15a2 in an axial direction, is inputted to the pilot chamber R11. A restriction projecting portion 15a4 is provided at an inner peripheral surface of the cylinder body 15a1 and positions the spool 15a2 by contacting with the front end surface of the second large diameter portion 15a2b of the spool 15a2.

The output chamber R12 is defined by the cylinder body 15a1, a small diameter portion 15a2c of the spool 15a2, a rear end surface of the second large diameter portion 15a2b and the front end surface of the first large diameter portion 15a2a. The output chamber R12 is connected to the servo chamber R5 of the master cylinder 12 via the conduit 26 which is connected to the port PT12 and the port PT2. Further, the output chamber R12 can be connectible with the accumulator 15b2 via the conduit 32 which is connected to the port PT13 (corresponding to the second port defined in the claims). The output chamber R12 outputs the hydraulic pressure which corresponds to the pilot pressure.

The hydraulic pressure chamber R13 is defined by the cylinder body 15a1 and the rear end surface of the first large diameter portion 15a2a of the spool 15a2. Further, the hydraulic pressure chamber R13 can be connectible with the reservoir 15b1 via the conduit 33 which is connected to the port PT14 (corresponding to the first port defined in the claims). A spring 15a3 is disposed in the hydraulic pressure chamber R13 which biases the hydraulic pressure chamber R13 in a direction, where the hydraulic pressure chamber R13 is enlarged.

The spool 15a2 is formed by the first large diameter portion 15a2a, the second large diameter portion 15a2b and the small diameter portion 15a2c. The first and the second large diameter portions 15a2a and 15a2b are formed such that they liquid-tightly slide within the cylinder body 15a1. The small diameter portion 15a2c is disposed between the first and the second large diameter portions 15a2a and 15a2b and are formed integrally therewith. The diameter of the small diameter portion 15a2c is formed to be smaller than the diameters of the first and the second large diameter portions 15a2a and 15a2b. A communication passage 15a5 is provided at the spool 15a2 to fluidically connect the output chamber R12 and the hydraulic pressure chamber R13.

The pressure supplying device 15b also serves as a driving portion which drives the spool 15a2. The pressure supplying device 15b includes a reservoir 15b1 which is a first hydraulic pressure source supplying of a predetermined hydraulic pressure, an accumulator 15b2 which accumulates the brake fluid and which serves as the second hydraulic pressure source supplying of a hydraulic pressure which is higher than the hydraulic pressure supplied from the reservoir 15b1, a pump 15b3 which pumps in the brake fluid from the reservoir 15b1 and pumps out to the accumulator 15b2 and an electric motor 15b4 which drives the pump 15b3. The reservoir 15b1 is exposed to the atmosphere and the hydraulic pressure in the reservoir 15b1 is the same level to the atmospheric pressure. The hydraulic pressure in the first hydraulic pressure source is lower than the hydraulic pressure in the second hydraulic pressure source. The pressure supplying device 15b includes the pressure sensor 15b5 which detects the pressure of the brake fluid supplied from the accumulator 15b2 and outputs the detection result to the brake ECU 17.

Further, the pressure supplying device 15b includes the pressure decreasing valve 15b6 and the pressure increasing valve 15b7. The pressure decreasing valve 15b6 is a normally open type structure electromagnetic valve which opens under the non-energized state. The flow-rate of the pressure decreasing valve 15b6 is controlled by the instructions from the brake ECU 17. One end of the pressure decreasing valve 15b6 is connected to the pilot chamber R11 via the conduit 31 and the other end thereof is connected the reservoir 15b1 via the conduits 34. The pressure increasing valve 15b7 is a normally closed type structure electromagnetic valve which closes under the non-energized state. The flow-rate of the pressure increasing valve 15b7 is controlled by the instructions from the brake ECU 17. One end of the pressure increasing valve 15b7 is connected to the pilot chamber R11 via the conduit 31 and the other end thereof is connected the accumulator 15b2 via the conduit 35 and the conduit 32 which is connected to the conduit 35.

The operation of the regulator 15a will be briefly explained hereinafter. When the pilot pressure is not supplied to the pilot chamber R11 from any of the pressure decreasing valve 15b6 and the pressure increasing valve 15b7, the spool 15a2 is biased to maintain the initial position by the biasing force of the spring 15a3 (See FIG. 1). The initial position of the spool 15a2 is the position where the front-end surface of the spool 15a2 is in contact with the restriction projecting portion 15a4 and is fixed to the position. This position is a position immediately before the rear end surface of the spool 15a2 closes the port PT14. Thus, when the spool is positioned at the initial position, the port PT14 and the port PT12 are in communication with each other through the communication passage 15a5 and at the same time the port PT13 is closed by the spool 15a2.

When the pilot pressure which is established in response to the operating amount of the brake pedal 11 is increased by the pressure decreasing valve 15b6 and the pressure increasing valve 15b7, the spool 15a2 slidably moves rearward by overcoming the biasing force of the spring 15a3 and then the port PT13 which has been closed by the spool 15a2 relatively moves to be opened. The port PT14 which has been open, now closes by the spool 15a2. Under such state, the rear end surface of the second large diameter portion 15a2b of the spool 15a2 receives the pressure which corresponds to the servo pressure (Pressure increasing operation).

Further, the pressurizing force of the front end surface of the second large diameter portion 15a2b of the spool 15a2 balances with the force corresponding to the servo pressure to define the position of the spool 15a2. This position of the spool 15a2 at this state is defined as a maintaining position. The port PT13 and the port PT14 are closed by the spool 15a2 (Pressure maintaining operation).

Further, when the pilot pressure which is established in response to the operating amount of the brake pedal 11 is decreased by the pressure decreasing valve 15b6 and the pressure increasing valve 15b7, the spool 15a2 positioned at the maintaining position slidably moves frontward by overcoming the biasing force of the spring 15a3 and then the port PT13 maintains the closed state and the port PT14 which has been in closed state opens. Under this state, the port PT14 and the port PT12 are in fluid communication through the communication passage 15a5. (Pressure decreasing operation).

Figure 3A:
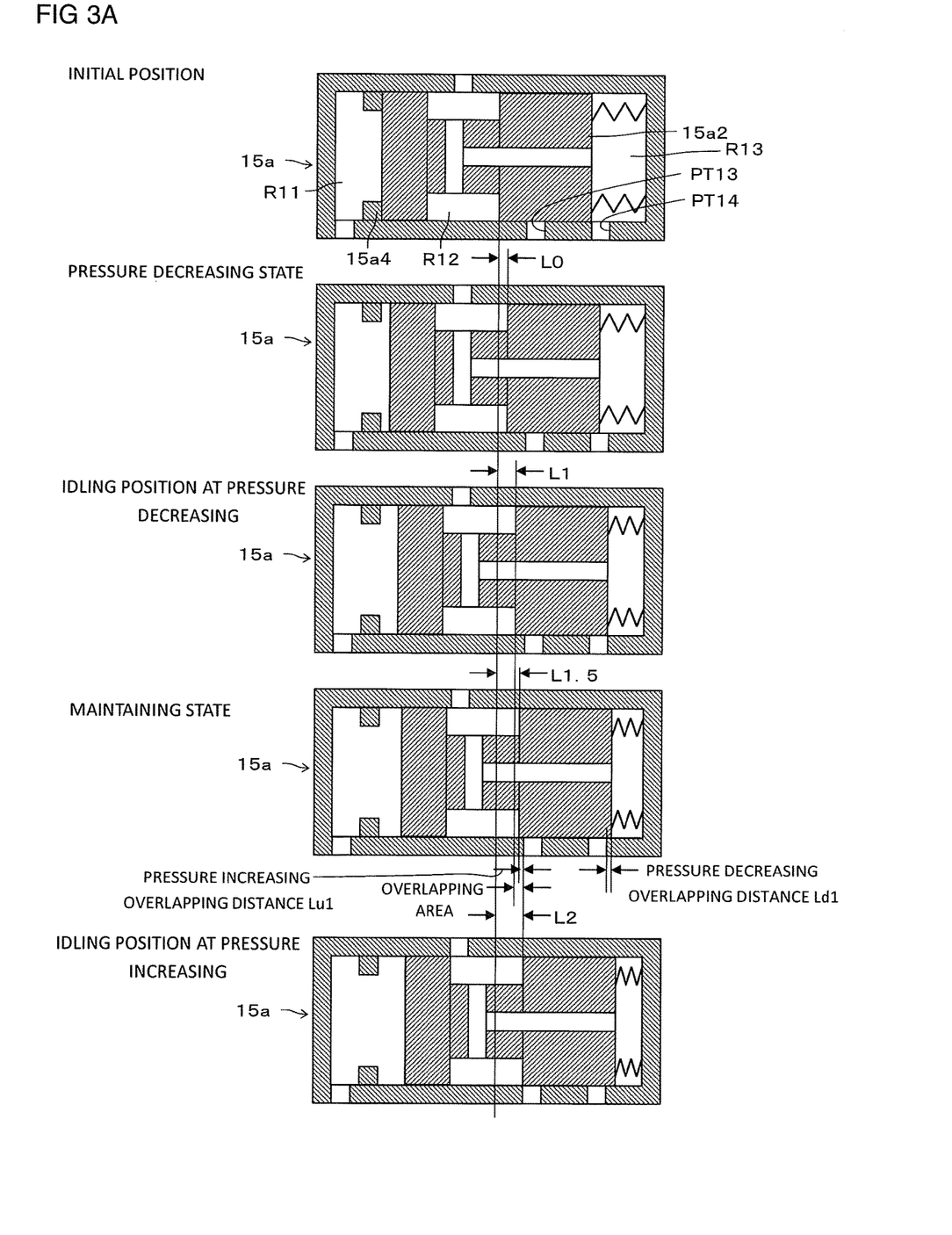
FIG. 3A is an explanatory diagram for explaining the operation of the regulator.
Figure 3B:
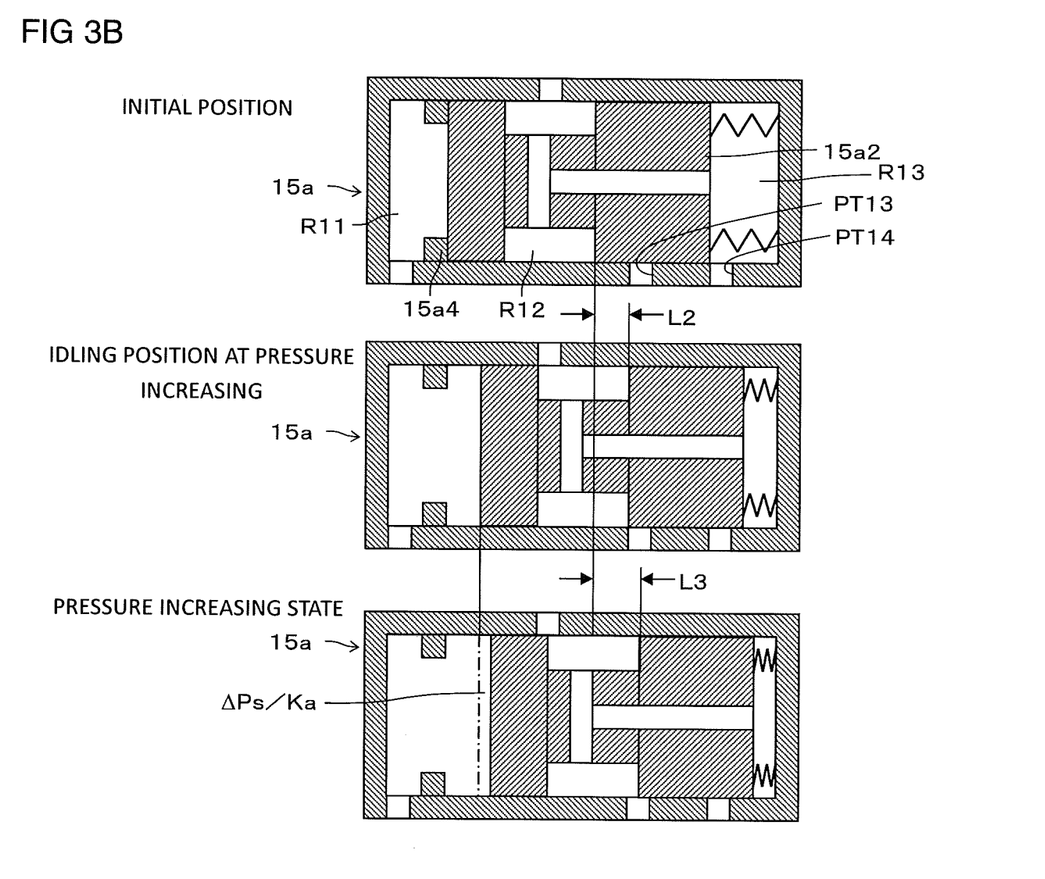
FIG. 3B is another explanatory diagram for explaining the operation of the regulator.

Further explanation will be made for operation of the regulator 15a with reference to FIGS. 3A and 3B. In FIG. 3A, from the top to the bottom, the initial position, pressure decreasing state, an idling position under the pressure decreasing state, the maintaining state and the idling position under the pressure increasing state of the spool 15a2 are illustrated. In FIG. 3B, from the top to the bottom, the initial position, the idling position under the pressure increasing state and the pressure increasing state of the spool 15a2 are illustrated. In other words, the state of the spool 15a2 from the initial position until reaching to the pressure increasing state is illustrated.

The initial position is the position where the spool 15a2 moves by the biasing force of the spring 15a3 until the front-end surface of the spool 15a2 is brought into contact with the restriction projecting portion 15a4 to be fixed to the position. It is noted that the initial position is the position immediately before the rear end surface of the spool 15a2 closes the port PT14 (first port).

The pressure decreasing state means that the spool 15a2 is positioned such that the port PT13 (second port) is closed and the port PT14 is open and that the output chamber R12 is in communication with the reservoir 15b1 which is the first hydraulic pressure source via the port PT14. The spool 15a2 has moved toward the right side by the distance L0 from the initial position. In other words, the relative position of the spool is represented as the distance L0.

The idling position under the pressure decreasing state means that the spool 15a2 keeps the port PT13 to be closed and the port PT14 which has been in the open state begins to close. Under this state, the output chamber R12 begins to be interrupted from the communication with the reservoir 15b1 via the port PT14 and is interrupted from the communication with the accumulator 15b2 which is the second hydraulic pressure source via the port PT13. The spool 15a2 has moved toward the right side by the distance L1 from the initial position. In other words, the relative position of the spool is represented as the distance L1.

In the maintaining state, the spool 15a2 positions where the port PT13 and the port PT14 are closed thereby. The output chamber R12 is interrupted from the communication with both the reservoir 15b1 and the accumulator 15b2. The spool 15a2 has moved toward the right side by the distance L1.5 from the initial position. In other words, the relative position of the spool is represented as the distance L1.5. In the maintaining state, the spool relative position is located in the area between the distance L1 and the distance L1.5. This area is called as the overlapping area.

Further, the regulator 15a is shifted to the pressure increasing state at the time when the spool 15a2 under the maintaining state has slidably moved from the maintaining position by a predetermined pressure increasing overlapping distance Lu1 (idling position at the time of pressure increasing (idling position under the pressure increasing state)). Further, the regulator 15a is shifted to the pressure decreasing state at the time when the spool 15a2 under the maintaining state has slidably moved from the maintaining position by a predetermined pressure decreasing overlapping distance Ld1 (idling position at the time of pressure decreasing (idling position under the pressure decreasing state)).

The idling position at the time of pressure increasing is the position where the spool 15a2 keeps closing the port PT14 and where the spool 15a2 begins opening of the port PT13 which has been in a closed state. The output chamber R12 is interrupted from the communication with the reservoir 15b1 via the port PT14 and at the same time the communication with the accumulator 15b2 begins through the port PT13. The spool 15a2 has moved toward the right side by the distance L2 from the initial position. In other words, the relative position of the spool is represented as the distance L2.

In the pressure increasing state, the spool 15a2 positions where the port PT14 is closed and the port PT13 is opened and the output chamber R12 is in fluid communication with the accumulator 15b2 via the port PT13 (position where the output chamber R12 is connected to the accumulator). The spool 15a2 has moved toward the right side by the distance L3 from the initial position. In other words, the relative position of the spool is represented as the distance L3.

The actuator 16 is a device which adjust the brake hydraulic pressure applied to each wheel cylinder WC and is provided with the first and the second conduit systems 40 and 50. The first conduit system 40 controls the brake hydraulic pressure applied to the rear-left wheel Wrl and the rear-right wheel Wrr, whereas the second conduit system 50 controls the brake hydraulic pressure applied to the front-right wheel Wfr and the front-left wheel Wfl. In other words, the front/rear conduit system is adopted as the conduit structure.

The hydraulic pressure from the master cylinder 12 is transmitted to each wheel cylinders WCrl, WCrr, WCfr and WCfl through the first and the second conduit systems 40 and 50. The first conduit system 40 is provided with a hydraulic passage 40a which connects the wheel cylinders WCrl and WCrr and the hydraulic passage 22. The second conduit system 50 is provided with a hydraulic passage 50a which connects the wheel cylinders WCfr and WCfl and the hydraulic passage 24. The hydraulic pressure from the master cylinder 12 is transmitted to each wheel cylinders WCrl, WCrr, WCfr and WCfl through these hydraulic passages 40a and 40b, respectively.

The hydraulic passages 40a and 50a are branched off to respective two hydraulic passages 40a1 and 40a2 and 50a1 and 50a2, respectively. Each hydraulic passage 40a1 and 50a1 is provided with each first pressure increasing valve 41 and 51 which controls the pressure increase of the brake hydraulic pressure to each wheel cylinder WCrl and WCfr. Another each hydraulic passage 40a2 and 50a2 is provided with the second pressure increasing valve 42 and 52 which controls the pressure increase of the brake hydraulic pressure to each wheel cylinder WCrr and WCfl.

These first and the second pressure increasing valves 41, 42, 51 and 52 are formed by a two positional electromagnetic valve which can control connection/disconnection state of the valve. The first and the second pressure increasing valves 41, 42, 51 and 52 are formed as a normally open type valve which becomes connected state when the control current to the solenoid coil provided in the respective valves 41, 42, 51 and 52 becomes zero (non-energized state) and becomes disconnected state when the control current flows through the solenoid coil (energized state).

The hydraulic passages 40a and 50a between the first and the second pressure increasing valves 41, 42, 51 and 52 and the wheel cylinders WCrl, WCrr, WCfr and WCfl are connected to the reservoirs 43 and 53, respectively through the portions of the hydraulic passages 40b and 50b functioning as the pressure decreasing hydraulic passage. In the hydraulic passages 40b and 50b, the first and the second pressure decreasing valves 44, 45, 54 and 55 are respectively provided which are formed by a two positional electromagnetic valve which can control connection/disconnection state of the valve. The first and the second pressure decreasing valves 44, 45, 54 and 55 are formed as a normally closed type valve which becomes disconnected state when the control current to the solenoid coil provided in the respective valves 44, 45, 54 and 55 becomes zero (non-energized state) and becomes connected state when the control current flows through the solenoid coil (energized state).

The hydraulic passages 40c and 50c which serve as the return hydraulic passages are provided between the reservoirs 43 and 53 and the hydraulic passages 40a and 50a which are the main hydraulic passages. The self-priming type pumps 46 and 56 which are driven by the common motor 47 are provided in the hydraulic passages 40c and 50c for sucking or discharging the brake fluid towards the master cylinder 12 side or the wheel cylinder WCrl, WCrr, WCfr and WCfl side from the reservoirs 43 and 53.

The pumps 46 and 56 suck the brake fluid from the reservoirs 43 and 53 and discharge to the hydraulic passages 40a and 50a to supply the wheel cylinders WCrl, WCrr, WCfr and WCfl with the brake fluid.

Further, the detected signals from the wheel speed sensors Sfl, Srr, Sfr and Srl equipped in each wheel Wfl, Wrr, Wfr and Wrl are inputted to the brake ECU 17. The brake ECU 17 calculates the wheel speed of each wheel, presumed vehicle body speed and slip ratio and so on, based on the detected signals from the wheel speed sensors Sfl, Srr, Sfr and Srl. The brake ECU 17 executes the anti-skid control and so on, based on the calculation results.

Each control using the actuator 16 is executed at the brake ECU 17. For example, by outputting the control current which controls each type of control valves 41, 42, 44, 45, 51, 52, 54 and 55 and the motor 47 which drives the pumps, the brake ECU 17 controls the hydraulic pressure circuit equipped in the actuator 16 to individually control the wheel cylinder pressures transmitted to the respective wheel cylinders WCrl, WCrr, WCfr and WCfl. For example, the brake ECU 17 executes the anti-skid control which prevents wheels from locking by executing pressure decreasing, pressure maintaining and pressure increasing of the wheel cylinder pressure when a wheel slips upon braking operation or executes a stability control which allows to perform an ideal turning operation of the vehicle by suppressing the skidding tendency (under-steer or over steer tendency) by automatically increasing the wheel cylinder pressure of the control subject wheel.

Figure 2:
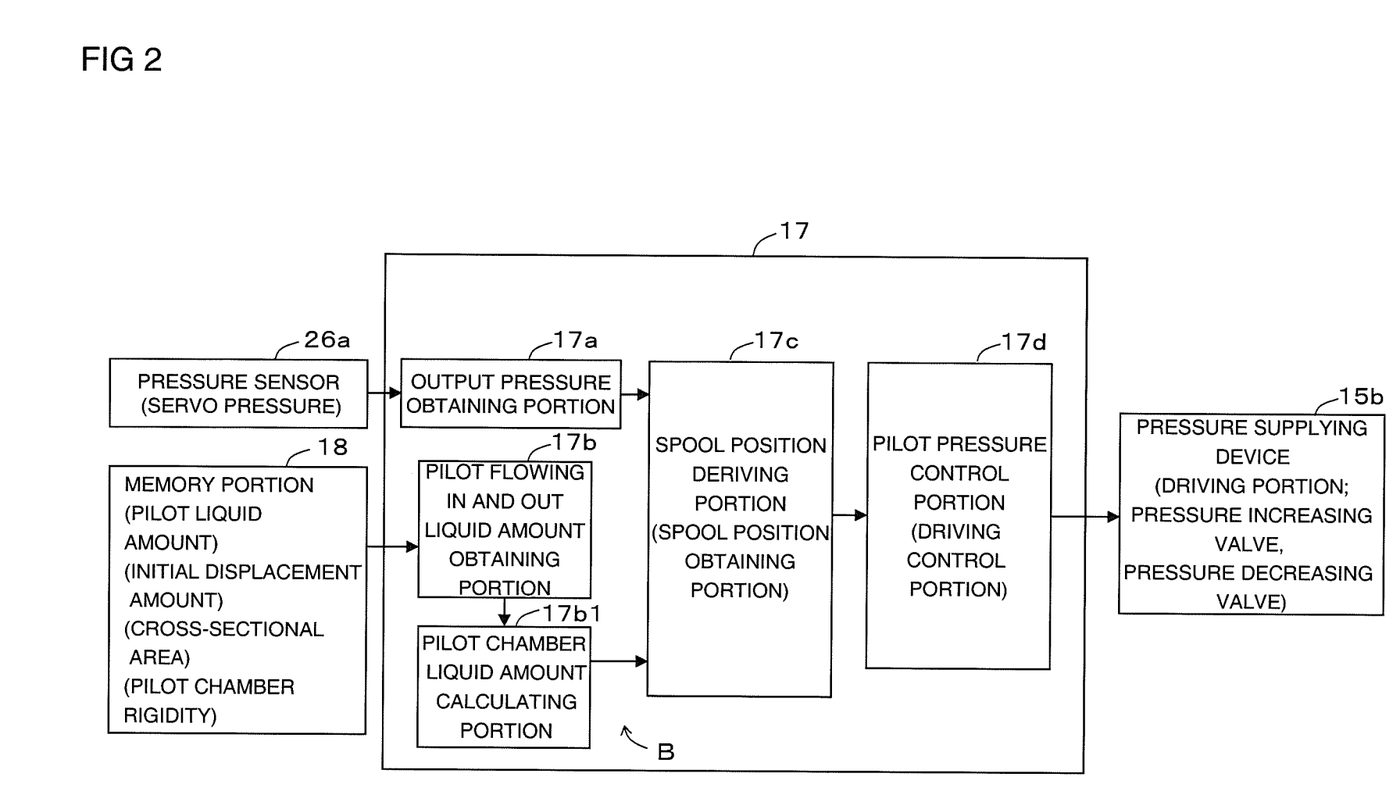
FIG. 2 is a block diagram of the brake ECU indicated in FIG. 1.

The brake ECU 17 includes as shown in FIG. 2, the output pressure obtaining portion 17a, the pilot flowing in and out liquid amount obtaining portion 17b, the pilot chamber liquid amount calculating portion 17b1, the spool position deriving portion 17c and the pilot pressure control portion 17d. The output pressure obtaining portion 17a obtains the servo pressure in the output chamber R12 from the pressure sensor 26a.

The pilot flowing in and out liquid amount obtaining portion 17b is a liquid amount obtaining portion which obtains the liquid amount which flows into or out of the pilot chamber R11 from the memory portion 18, as the pilot flowing in and out liquid amount. The liquid amount corresponds to the total amount of the brake fluid which flows into or out of the pilot chamber R11. This liquid amount can be calculated by a predetermined time integration of the flow-rate per unit time. It is noted that the flow-rate in this case is not the flow-rate as the detected value, but the flow-rate as the control instruction value (control target flow-rate) relative to the pressure increasing valve 15b7 and the pressure decreasing valve 15b6 of the pressure supplying device 15b. The flow-rate as the control instruction value is memorized in the memory portion 18 together with the instructions to the pressure increasing valve 15b7 and the pressure decreasing valve 15b6. The pilot flowing in and out liquid amount can be calculated by integrating the control target flow-rate. It is noted that this pilot flowing in and out liquid amount can be actually detected by using a sensor.

The pilot chamber liquid amount calculating portion 17b1 is a liquid amount calculating portion which calculates the liquid amount in the pilot chamber R11 (which will be explained later as the pilot chamber liquid amount V) based on the liquid amount obtained by the pilot flowing in and out liquid amount obtaining portion 17b. For example, the pilot chamber liquid amount calculating portion 17b1 calculates the liquid amount in the pilot chamber R11 based on the liquid amount which flows into or out of the pilot chamber obtained by the pilot flowing in and out liquid amount obtaining portion 17b from the time the braking operation starts until the current time.

The memory portion 18 is connected to the brake ECU 17. The memory portion 18 memorizes in addition to the control instruction values to the pressure increasing valve 15b7 and the pressure decreasing valve 15b6, the initial moving amount L1 of the spool 15a2, the area S of the regulator 15a and the rigidity of the pilot chamber R11, etc. The initial moving amount L1 of the spool 15a2, the area S of the regulator 15a and the rigidity of the pilot chamber R11 are the values inherent to the regulator 15a and the design values thereof. The values are derivable in advance from the experiment work or the use of simulator.

The spool position deriving portion 17c derives the relative position of the spool 15a2 relative to the cylinder body 15a1 (hereinafter, may be referred to as spool relative position). According to this embodiment, although the spool position derivation portion 17c presumes the spool position, the spool position derivation portion 17c can directly detect the spool position. The spool position derivation portion 17c is referred to as a spool position derivation portion including both the case of presuming the spool position and the case of directly detecting the spool position. When the spool position derivation portion 17c obtains the spool position from a sensor directly detecting the spool position, the spool position derivation portion 17c functions as a spool position obtaining portion.

The spool position deriving portion 17c derives the spool relative position based on the servo pressure obtained by the output pressure obtaining portion 17a. This deriving method requires the condition that the servo pressure is generated (particularly, change of the servo pressure). In more concretely, the spool position deriving portion 17c derives the spool relative position by the following mathematic expression (M1).

$$\text{Spool relative position} = (\text{servo pressure change amount } \Delta Ps/\text{rigidity } Ka \text{ of pilot chamber } R11)/\text{area } S \text{ of regulator } 15a \quad (M1)$$

Wherein (servo pressure change amount $\Delta Ps$/rigidity $Ka$ of pilot chamber R11) represents the liquid amount (volume) flowing into or out of the pilot chamber R11 when the servo pressure changes. The unit of the change amount $\Delta Ps$ is pascal and the unit of the rigidity $Ka$ of pilot chamber R11 is pascal/cm3 (or pascal/cc).

When the liquid amount of the pilot chamber R11 changes, the pressure in the pilot chamber R11 changes accordingly. In other words, the volume of the pilot chamber R11 changes. The spool 15a2 maintains the position when the pressure in the hydraulic pressure chamber R13 balances with the pressure in the pilot chamber R11 (maintaining position). Then, the pressure in the hydraulic pressure chamber R13, i.e., the pressure in the output chamber R12 becomes the same pressure. In other words, the change amount of the servo pressure and the change amount of the pilot pressure are the same. Accordingly, (servo pressure change amount $\Delta Ps$/rigidity $Ka$ of pilot chamber R11) represents the liquid amount (volume) flowing into or out of the pilot chamber R11 when the servo pressure changes.

It is noted that the absolute position of the spool 15a2 (hereinafter may be referred to as spool relative position) can be calculated relative to a randomly selected reference position P0. In other words, the absolute position of the spool 15a2 can be obtained by adding or subtracting the derived spool relative position to or from the reference position P0. As the reference position P0, the idling position at pressure increasing time when the brake pedal 11 is initially depressed, the maintaining position while the brake control operation is performed, or the idling position at the pressure decreasing time, etc.

The area S of the regulator 15a is the cross-sectional area of the bore of the cylinder body 15a1. The area S of the regulator 15a is the pressure receiving area of the rear end surface of the first large diameter portion 15a2a and the pressure receiving area of the front end surface of the second large diameter portion 15a2b which are the same with the cross-sectional area of the bore of the cylinder body 15a1.

The spool position deriving portion 17c derives the spool relative position based on the liquid amount in the pilot chamber R11 calculated by the pilot chamber liquid amount calculating portion 17b1. According to this method, the spool relative position can be derivable even the servo pressure is not generated, or the servo pressure is a certain constant value which is zero or more than zero. In more concretely, the spool position deriving portion 17c derives the spool relative position by the following mathematic expression (M2).

Spool relative position=(liquid amount $V$ in pilot chamber/area $S$ of regulator 15*a*) (M2)

Wherein, the liquid amount V in the pilot chamber corresponds to the brake fluid amount in the pilot chamber R11. This liquid amount V in the pilot chamber is actually not detected but can be calculated by the liquid amount which flows into or out of the pilot chamber obtained by the pilot flowing in and out liquid amount obtaining portion 17*b* from the time the brake operation starts until the current time.

It is noted here that even in this case, the absolute position of the spool 15*a*2 can be calculated relative to a randomly selected reference position P0. In other words, the absolute position of the spool 15*a*2 can be obtained by adding or subtracting the derived spool relative position to or from the reference position P0. As the reference position P0, the idling position at pressure increasing time when the brake pedal 11 is initially depressed, the maintaining position while the brake control operation is performed, or the idling position at the pressure decreasing time, etc.

The spool position deriving portion 17*c* can add up the spool relative position calculated at each scene relative to the reference position P0 from the time of brake pedal 11 depression until the brake pedal 11 depression releasing and calculate the spool relative position. Further, once the brake depression is released, the spool position deriving portion 17*c* cancels the hitherto calculated spool relative position or the spool relative position. Accordingly, when a new brake pedal 11 depression starts, the spool position deriving portion 17*c* newly adds up the spool relative position calculated at each scene relative to the reference position P0 and eventually calculates a new spool relative position.

The pilot pressure control portion 17*d* controls the pressure supplying device 15*b* (driving portion) to drive the spool 15*a*2 to thereby control the pilot pressure based on the spool relative position (or the spool absolute position) derived by the spool position deriving portion 17*c*. In detail, the pilot pressure control portion 17*d* by using the map illustrated in FIG. 4, calculates the control flow rate which corresponds to the spool relative position thereby to control the pressure supplying device 15*b* (particularly, the pressure increasing valve 15*b*7 and the pressure decreasing valve 15*b*6) to supply the calculated control flow-rate.

Figure 4:
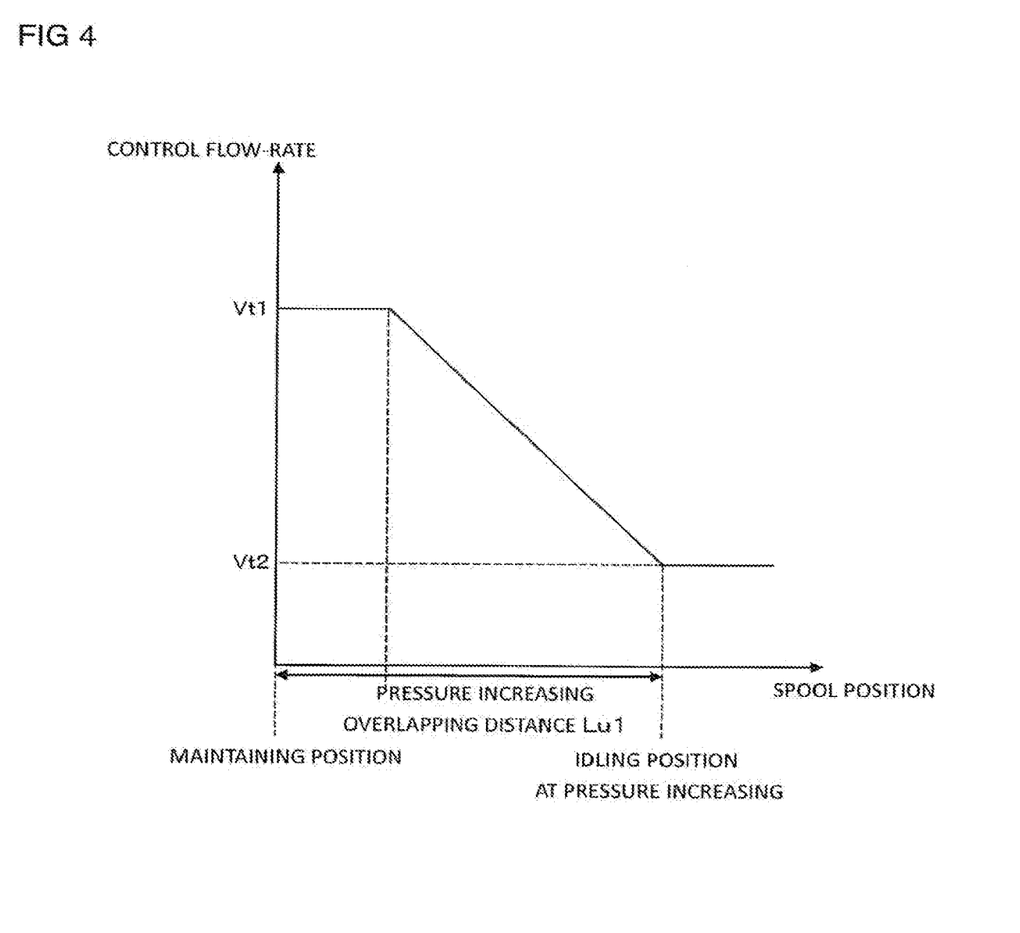
FIG. 4 is a map which indicates the relationship between the spool position and the controlled flow-rate (controlled flow rate flowing into the pilot chamber by the pressure increasing valve and the pressure decreasing valve) when the spool valve is shifted from the maintaining state to the pressure increasing.

The map shown in FIG. 4 indicates the relationship between the spool relative position (or the absolute position) and the control flow-rate. The map is prepared so that the control flow-rate to the pilot chamber R11 (flow-rate per unit time) when the spool relative position is within the range of the position from the maintaining position which is the relative position under the maintaining state to the idling position at pressure increasing which is the relative position that the spool 15*a*2 has slidably moved by the pressure increasing overlapping distance Lu1 from the maintaining position becomes larger than the control flow-rate where the spool relative position is the range other than the above (for example, the range where the relative position is located further pressure increasing side than the idling position at pressure increasing), upon shifting of the spool valve 15*a* from the maintaining state to the pressure increasing state. In other words, the map is prepared so that the change amount of the pilot pressure per unit time becomes larger in the pressure increasing direction of the output pressure.

For example, when the spool 15*a*2 is located inside of the predetermined range from the maintaining position, the control flow-rate is set to be constant to the first control flow-rate Vt1. The control flow-rate is set to be decreasing by a certain amount from the first control flow-rate Vt1 to the second control flow-rate Vt2 while the spool relative position exceeds the predetermined range and reaches the idling position at pressure increasing. When the spool 15*a*2 has slidably moved beyond the idling position at pressure increasing, the control flow-rate is set to be constant to the second control flow-rate Vt2.

It is noted that upon shifting the spool valve 15*a* from the maintaining state to the pressure increasing state, instead of shifting from the maintaining position, shifting from the idling position at pressure decreasing is performed as the same manner. In this shifting, it is set so that the control flow-rate to the pilot chamber R11 (flow-rate per unit time) when the spool relative position is within the range from the idling position at pressure decreasing which is the relative position under the maintaining state to the idling position at pressure increasing where the spool 15*a*2 has slidably moved by the pressure increasing overlapping distance Lu2 (which is larger than the value Lu1 and the value is the same with the overlapping area) from the maintaining position becomes larger than the control flow-rate where the spool relative position is in the range other than the above range (for example, the range where the relative position is located further pressure increasing side than the idling position at the pressure increasing).

Upon shifting of the regulator 15*a* from the maintaining state to the pressure increasing state, the pilot pressure control portion 17*d* increases the change amount of the pilot pressure per unit time when the relative position obtained by the spool position obtaining portion 17*c* (or derived by the spool position deriving portion 17*c*) is within the range from the relative position under the maintaining state (for example, the maintaining position) to the relative position (idling position at pressure increasing) where the spool 15*a*2 has slidably moved by the pressure increasing overlapping distance Lu1 from the relative position under the maintaining state to be larger in the pressure increasing direction of the output pressure than when the spool relative position is the range outside of the above range. In other words, the pilot pressure control portion 17*d* increases the control flow-rate to the pilot chamber R11 (flow-rate per unit time).

Figure 5:
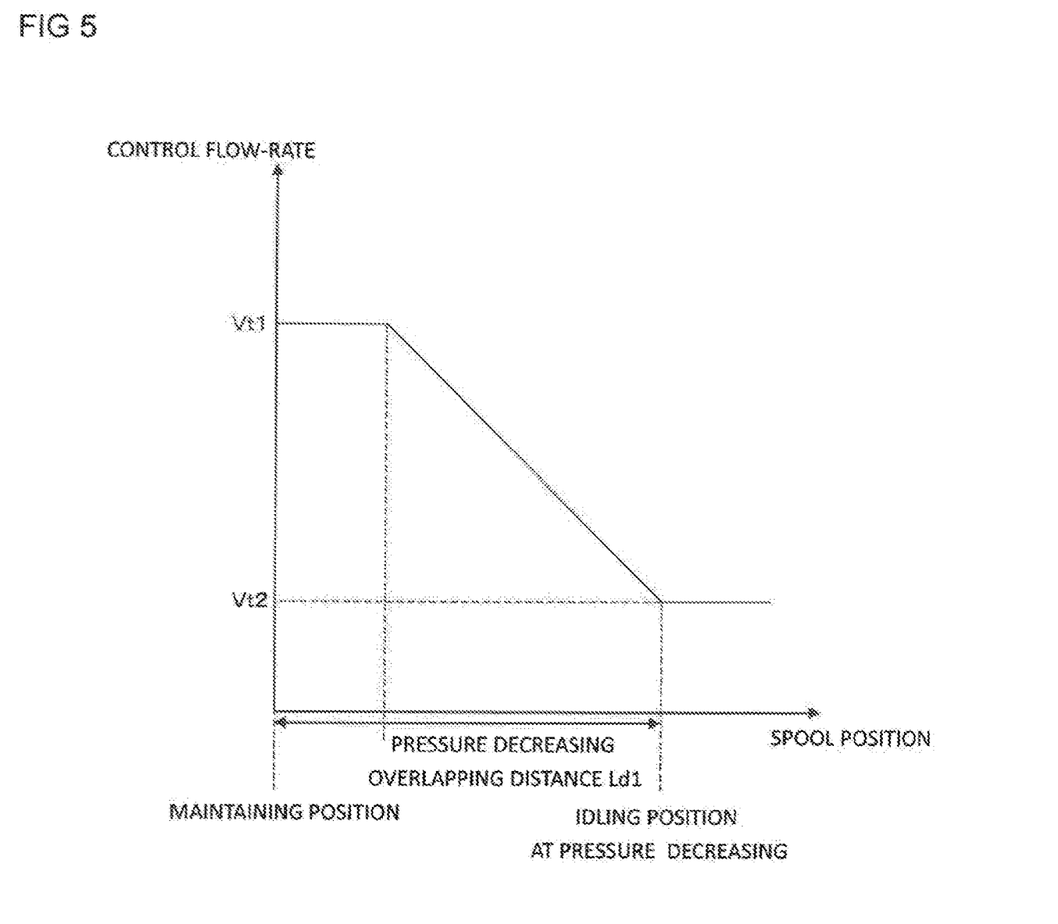
FIG. 5 is a map which indicates the relationship between the spool position and the controlled flow-rate when the spool valve is shifted from the maintaining state to the pressure decreasing state.

A map such as shown in FIG. 5 is used when the spool valve 15*a* is shifted from the maintaining state to the pressure decreasing state. The map is prepared so that the control flow-rate to the pilot chamber R11 (flow-rate per unit time) when the spool relative position is within the range of the position from the maintaining position which is the relative position under the maintaining state to the idling position at pressure decreasing which is the relative position that the spool 15*a*2 has slidably moved by the pressure decreasing overlapping distance Lu1 from the maintaining position becomes larger than the control flow-rate where the spool relative position is in the range other than the above (for example, the range where the relative position is located further pressure decreasing side than the idling position at pressure decreasing). In other words, the map is prepared so that the change amount of the pilot pressure per unit time becomes larger in the pressure decreasing direction of the output pressure.

Further, it is noted that upon shifting the spool valve 15*a* from the maintaining state to the pressure decreasing state, instead of shifting from the maintaining position, shifting from the idling position at pressure increasing is performed as the same manner. In this shifting, it is set so that the control flow-rate to the pilot chamber R11 (flow-rate per unit time) when the spool relative position is within the range from the idling position at pressure increasing which is the relative position under the maintaining state to the idling position at pressure decreasing which is the relative position where the spool 15a2 has slidably moved by the pressure decreasing overlapping distance Ld2 (which is larger than the value Ld1 and the value is the same with the overlapping area) from the maintaining position becomes larger than the control flow-rate where the spool relative position is in the range other than the above range (for example, the range where the relative position is located further pressure decreasing side than the idling position at the pressure decreasing).

Upon shifting of the regulator 15a from the maintaining state to the pressure decreasing state, the pilot pressure control portion 17d increases the change amount of the pilot pressure per unit time when the relative position obtained by the spool position obtaining portion 17c (or derived by the spool position deriving portion 17c) is within the range from the relative position under the maintaining state (for example, the maintaining position) to the relative position (idling position at pressure decreasing) where the spool 15a2 has slidably moved by the pressure decreasing overlapping distance Ld1 from the relative position under the maintaining state to be larger in the pressure decreasing direction of the output pressure than when the relative position is the range outside of the above range. In other words, the pilot pressure control portion 17d increases the control flow-rate to the pilot chamber R11 (flow-rate per unit time).

Apparent from the explanation above, according to the embodiment, the hydraulic pressure generating device includes a regulator 15a (spool valve) formed by a cylinder body 15a1, a spool 15a2 which slidably moves within the cylinder body 15a1, a pilot chamber R11 in which a pilot pressure which is a hydraulic pressure moving the spool 15a2 along in an axial direction is inputted and an output chamber R12 out of which an output pressure (servo pressure) which is a hydraulic pressure corresponding to the pilot pressure is outputted, wherein the hydraulic pressure generating device further includes a spool position obtaining portion 17c which obtains a relative position of the spool 15a2 relative to the cylinder body 15a1 and a pilot pressure controlling portion 17d which controls the pilot pressure based on the relative position obtained by the spool position obtaining portion 17c.

According to the structure above, the relative position of the spool 15a2 can be obtained more accurately and yet in an early stage. Further, based on the relative position obtained accurately and in an early stage, the pilot pressure can be controlled to drive the spool 15a2. Accordingly, the responsiveness of the regulator 15a can be able to be improved and a hydraulic pressure generating device which has improved the responsiveness of the regulator 15a can be proposed.

Further, according to the embodiment, in the hydraulic pressure generating device explained above, the cylinder body 15a1 is formed by the port PT14 (first port) which connects the reservoir 15b1 (first hydraulic pressure source) and the output chamber R12 and the port PT13 (second port) which connects the accumulator 15b2 (second hydraulic pressure source) which supplies with the hydraulic pressure higher than the hydraulic pressure supplied from the reservoir 15b1 and the output chamber R12. The regulator 15a (spool valve) closes the ports PT14 and PT13 by the spool 15a2 under the maintaining state where the output pressure is maintained and closes the port PT14 by the spool 15a2 and at the same time opens the port PT13 under the pressure increasing state where the output pressure is increasing and shifts to the pressure increasing state when the spool 15a2 has slidably moved from the maintaining position of the spool 15a2 in the maintaining state by a predetermined pressure increasing overlapping distance. The pilot pressure control portion 17d increases the change amount of the pilot pressure per unit time in the pressure increasing direction of the output pressure in a case that the relative position obtained by the spool position obtaining portion 17c is within the range of position from the relative position of the spool 15a2 under the maintaining state to the relative position where the spool 15a2 has slidably moved by the pressure increasing overlapping distance from the relative position under the maintaining state more than the change width amount of the pilot pressure per unit time in a case that the relative position is out of the range, upon shifting of the regulator 15a from the maintaining state to the pressure increasing state.

Thus, the regulator 15a under the maintaining state drives the spool 15a2 which is in the overlapping range by appropriately controlling the pilot pressure to thereby swiftly shift the state from the maintaining to the pressure increasing. As the result, the responsiveness of the regulator 15a can be further improved and the hydraulic pressure generating device which has the regulator 15a which responsiveness has been improved can be proposed.

Further, according to the embodiment, in the hydraulic pressure generating device explained above, the cylinder body 15a1 is formed by the port PT14 (first port) which connects the reservoir 15b1 (first hydraulic pressure source) and the output chamber R12 and the port PT13 (second port) which connects the accumulator 15b2 (second hydraulic pressure source) which supplies with the hydraulic pressure higher than the hydraulic pressure supplied from the reservoir 15b1 and the output chamber R12. The regulator 15a (spool valve) closes the ports PT14 and PT13 by the spool 15a2 under the maintaining state where the output pressure is maintained and closes the port PT13 by the spool 15a2 and at the same time opens the port PT14 under the pressure decreasing state where the output pressure is decreasing and shifts to the pressure decreasing state when the spool 15a2 has slidably moved from the maintaining position of the spool 15a2 in the maintaining state by a predetermined pressure decreasing overlapping distance. The pilot pressure control portion 17d increases the change amount of the pilot pressure per unit time in the pressure decreasing direction of the output pressure when the relative position obtained by the spool position obtaining portion 17c is within the range of position from the relative position of the spool 15a2 under the maintaining state to the relative position thereof where the spool 15a2 has slidably moved by the pressure decreasing overlapping distance from the relative position under the maintaining state more than the change amount of the pilot pressure per unit time in a case that the relative position is out of the range of position, upon shifting of the regulator 15a from the maintaining state to the pressure decreasing state.

Thus, the regulator 15a under the maintaining state drives the spool 15a2 which is in the overlapping range by appropriately controlling the pilot pressure to thereby swiftly shift the state from the maintaining to the pressure decreasing. As the result, the responsiveness of the regulator 15a can be further improved and the hydraulic pressure generating device which has the regulator 15a which responsiveness has been improved can be proposed.

As explained above, since the change of the relative position of the spool 15a2 appears in the change of the output pressure under the regulator 15a being in the pressure increasing state or the pressure decreasing state, the relative position of the spool 15a2 can be derived (presumed) from the output pressure. However, in the range of overlapping area of the spool 15a2, the relative position of the spool 15a2 does not appear in the change of the output pressure and accordingly, the relative position of the spool 15a2 cannot be derived (presumed) from the output pressure.

On the other hand, the hydraulic pressure generating device according to the embodiment includes a pilot flowing in and out liquid amount obtaining portion 17b (liquid amount obtaining portion) which obtains the liquid amount flowing into and out of the pilot chamber R11 and the pilot chamber liquid amount calculating portion 17b1 (liquid amount calculating portion) which calculates the liquid amount in the pilot chamber R11 based on the liquid amount obtained by the pilot flowing in and out liquid amount obtaining portion 17b, wherein the pilot chamber R11 is defined by one end surface of the spool 15a2 in an axial direction and the spool position deriving portion (spool position obtaining portion) 17c derives the relative position based on the divided value of the liquid amount which is calculated by the pilot chamber liquid amount calculating portion 17b1 divided by the area of the one end surface of the spool 15a2.

Thus, the relative position of the spool 15a2 can be derived from the pilot chamber liquid amount. As the result, the relative position of the spool 15a2 under the overlapping area can be derived (presumed).

The spool position presuming device B according to the embodiment comprises the regulator 15a formed by the cylinder body 15a1, the spool 15a2 slidable in the cylinder body 15a1, the pilot chamber R11 in which the pilot pressure as the hydraulic pressure moving the spool 15a2 in an axial direction is inputted and the output chamber R12 which outputs the output pressure which is the hydraulic pressure corresponding to the pilot pressure. The pilot chamber R11 of the regulator 15a is defined by the one end surface of the spool 15a2 in the axial direction. The spool position presuming device B includes the pilot flowing in and out liquid amount obtaining portion 17b which obtains the liquid amount flowing into and out of the pilot chamber R11, the pilot chamber liquid amount calculating portion 17b1 which calculates the liquid amount in the pilot chamber R11 based on the liquid amount obtained by the pilot flowing in and out liquid amount obtaining portion 17b and the spool relative position deriving portion 17c which derives the relative position of the spool 15a2 relative to the cylinder body 15a1 based on a divided value of the liquid amount which is calculated by the pilot chamber liquid amount calculating portion 17b1 divided by an area of the one end surface of the spool 15a2.

As explained above, since the change of the relative position of the spool 15a2 appears in the change of the output pressure under the regulator 15a being in the pressure increasing state or the pressure decreasing state, the relative position of the spool 15a2 can be derived (presumed) from the output pressure. However, in the range of overlapping area of the spool 15a2, the relative position of the spool 15a2 does not appear in the change of the output pressure and accordingly, the relative position of the spool 15a2 cannot be derived (presumed) from the output pressure.

On the other hand, the spool position presuming device B according to the embodiment includes a pilot flowing in and out liquid amount obtaining portion 17b (liquid amount obtaining portion) which obtains the liquid amount flowing into and out of the pilot chamber R11 and the pilot chamber liquid amount calculating portion 17b1 (liquid amount calculating portion) which calculates the liquid amount in the pilot chamber R11 based on the liquid amount obtained by the pilot flowing in and out liquid amount obtaining portion 17b, wherein the pilot chamber R11 is defined by one end surface of the spool 15a2 in an axial direction and the spool position deriving portion 17c derives the relative position based on a divided value of the liquid amount which is calculated by the pilot chamber liquid amount calculating portion 17b1 divided by an area of the one end surface of the spool 15a2.

Thus, the relative position of the spool 15a2 can be derived from the pilot chamber liquid amount. As the result, the relative position of the spool 15a2 under the overlapping area can be derived (presumed).

It is noted here that instead of using the pressure increasing valve 15b7 and the pressure decreasing valve 15b6, the spool 15a2 may be driven by an electric motor. In such a case, the spool relative position (or the spool absolute position) can be derived by detecting not by presuming.

The invention claimed is:
1. A hydraulic pressure generating device comprising:
a spool valve formed by a body, a spool which slidably moves within the body, a pilot chamber in which a pilot pressure which is a hydraulic pressure moving the spool along in an axial direction is inputted and an output chamber out of which an output pressure which is a pressure corresponding to the pilot pressure is outputted, wherein the hydraulic pressure generating device further includes
a spool position obtaining portion which obtains a relative position of the spool relative to the body and
a pilot pressure controlling portion which controls the pilot pressure based on the relative position obtained by the spool position obtaining portion, wherein
the body is formed by a first port which connects a first hydraulic pressure source supplying with a predetermined hydraulic pressure and the output chamber, and a second port which connects a second hydraulic pressure source which supplies with the hydraulic pressure higher than the hydraulic pressure supplied from the first hydraulic pressure source and the output chamber, wherein
the spool valve 1) closes the first port and the second port by the spool under a maintaining state where the output pressure is maintained, 2) closes the first port by the spool and at the same time opens the second port under a pressure increasing state where the output pressure is increasing, and 3) shifts to the pressure increasing state when the spool has slidably moved from the maintaining position of the spool in the maintaining state by more than a predetermined pressure increasing overlapping distance, and wherein
upon shifting of the spool valve from the maintaining state to the pressure increasing state,
the pilot pressure control portion increases a change amount of the pilot pressure per unit time in a pressure increasing direction of the output pressure by a first amount in a case that the relative position obtained by the spool position obtaining portion is within a range from the relative position of the spool under the maintaining state to the relative position where the spool has slidably moved by the pressure increasing overlapping distance from the relative position under the maintaining state, and
the pilot pressure control portion increases the change amount of the pilot pressure per unit time in the pressure increasing direction of the output pressure by a second amount that is less than the first amount, in a case that the relative position of the spool is out of the range.

2. The hydraulic pressure generating device according to claim 1, further comprising:
   a liquid amount obtaining portion which obtains a liquid amount flowing into and out of the pilot chamber; and
   a liquid amount calculating portion which calculates the liquid amount in the pilot chamber based on the liquid amount obtained by the liquid amount obtaining portion, wherein
   the pilot chamber is defined by one end surface of the spool in an axial direction and
   the spool position obtaining portion is a spool position deriving portion that derives the relative position based on a divided value of the liquid amount which is calculated by the liquid amount calculating portion divided by an area of the one end surface of the spool.

3. A hydraulic pressure generating device comprising:
   a spool valve formed by a body, a spool which slidably moves within the body, a pilot chamber in which a pilot pressure which is a hydraulic pressure moving the spool along in an axial direction is inputted and an output chamber out of which an output pressure which is a pressure corresponding to the pilot pressure is outputted, wherein the hydraulic pressure generating device further includes
   a spool position obtaining portion which obtains a relative position of the spool relative to the body and
   a pilot pressure controlling portion which controls the pilot pressure based on the relative position obtained by the spool position obtaining portion, wherein
   the body is formed by a first port which connects a first hydraulic pressure source supplying with a predetermined hydraulic pressure and the output chamber, and a second port which connects a second hydraulic pressure source which supplies with the hydraulic pressure higher than the hydraulic pressure supplied from the first hydraulic pressure source and the output chamber, wherein
   the spool valve 1) closes the first port and the second port by the spool under a maintaining state where the output pressure is maintained, 2) closes the second port by the spool and at the same time opens the first port under a pressure decreasing state where the output pressure is decreasing, and 3) shifts from to the pressure decreasing state when the spool has slidably moved from a maintaining position of the spool in the maintaining state by more than a predetermined pressure decreasing overlapping distance, and wherein
   upon shifting of the spool valve from the maintaining state to the pressure decreasing state,
   the pilot pressure control portion increases a change amount of the pilot pressure per unit time in a pressure decreasing direction of the output pressure by a first amount in a case that the relative position obtained by the spool position obtaining portion is within a range from the relative position of the spool under the maintaining state to the relative position where the spool has slidably moved by the pressure decreasing overlapping distance from the relative position under the maintaining state, and
   the pilot pressure control portion increases the change amount of the pilot pressure per unit time in the pressure decreasing direction of the output pressure by a second amount that is less than the first amount, in a case that the relative position of the spool is out of the range.

4. The hydraulic pressure generating device according to claim 3, further comprising:
   a liquid amount obtaining portion which obtains a liquid amount flowing into and out of the pilot chamber; and
   a liquid amount calculating portion which calculates the liquid amount in the pilot chamber based on the liquid amount obtained by the liquid amount obtaining portion, wherein
   the pilot chamber is defined by one end surface of the spool in an axial direction and
   the spool position obtaining portion is a spool position deriving portion that derives the relative position based on a divided value of the liquid amount which is calculated by the liquid amount calculating portion divided by an area of the one end surface of the spool.

* * * * *